United States Patent [19]

Crabbe, Jr.

[11] Patent Number: 4,692,897
[45] Date of Patent: Sep. 8, 1987

[54] ARRANGEMENT FOR DYNAMIC RANGE CHECKING OR MATCHING FOR DIGITAL VALUES IN A SOFTWARE SYSTEM

[75] Inventor: Edwin P. Crabbe, Jr., Peoria, Ariz.

[73] Assignee: GTE Communication Systems Corporation, Phoenix, Ariz.

[21] Appl. No.: 9,042

[22] Filed: Jan. 28, 1987

Related U.S. Application Data

[63] Continuation of Ser. No. 646,728, Sep. 4, 1984, abandoned.

[51] Int. Cl.⁴ ............................................. G06F 11/30
[52] U.S. Cl. ...................................... 364/900; 371/25; 371/16
[58] Field of Search ................. 371/16, 67, 25, 27; 364/200 MS File, 900 MS File, 716; 340/146.2; 324/73 R

[56] References Cited

U.S. PATENT DOCUMENTS

| 3,350,685 | 10/1967 | Lindaman | 340/146.2 |
|---|---|---|---|
| 3,579,199 | 5/1971 | Anderson | 364/200 |
| 4,100,532 | 7/1978 | Farnbach | 364/481 |
| 4,315,313 | 2/1982 | Armstrong et al. | 371/16 |
| 4,475,237 | 10/1984 | Glasby | 371/67 |
| 4,511,961 | 4/1985 | Penton | 364/200 |
| 4,513,419 | 4/1985 | Small | 340/146.2 |
| 4,542,456 | 9/1985 | Hill | 364/200 |

FOREIGN PATENT DOCUMENTS

| 140179 | 11/1978 | German Democratic Rep. | 371/16 |
|---|---|---|---|
| 8103078 | 10/1981 | PCT Int'l Appl. | 371/16 |
| 1536147 | 12/1978 | United Kingdom | 371/16 |

OTHER PUBLICATIONS

*Basic Programs for Scientists and Engineers*, by Alan R. Miller, pp. 13–27, (copyright 1981).

Primary Examiner—Raulfe B. Zache
Assistant Examiner—Lawrence E. Anderson
Attorney, Agent, or Firm—Frank J. Bogacz; Peter Xiarhos

[57] ABSTRACT

This invention discloses a circuit for examining the value transmitted via a digital bus. A determination is made as to whether the value matches a predefined programmable value. An output indication is given for a match. In addition, this circuit may examine the transmitted value to determine whether it is within the bounds of a predefined range of values. This circuit utilizes a minimum of space and hardware components, due to its fabrication using RAM devices and a program logic array.

9 Claims, 2 Drawing Figures

ARRANGEMENT FOR DYNAMIC RANGE CHECKING OR MATCHING FOR DIGITAL VALUES IN A SOFTWARE SYSTEM

This is a continuation of co-pending application Ser. No. 646,728 filed on Sept. 4, 1984 now abandoned.

BACKGROUND OF THE INVENTION

The present invention pertains to a software development system and more particularly to an arrangement for interrupting the normal operation of a processor for testing purposes.

A basic feature of any software development system is the ability to temporarily stop the processing of a central processing unit (breakpoint) upon the occurrence of a particular software event. One method of accomplishing a breakpoint is to actually modify the program instructions in memory such that, when the desired location in memory has been reached, a halt or an interrupt instruction is encountered in order to freeze the execution of the program at that point.

This method can only detect instruction execution. It cannot detect an access of a certain data word in memory or the access of a particular input/output port. This is the chief shortcoming of such software breakpoints.

Detecting memory data word access or input/output port access is best accomplished by a hardware matcher. A hardware matcher is a device which monitors the address and data busses of a system and compares the bit pattern present for an access to these busses with a predefined bit pattern in order to generate an indication of a comparison match.

One method of implementing a hardware matcher is with exclusive-OR gates or magnitude comparators. Since exclusive-OR gates and comparator devices are typically packaged to handle four bits per chip, matchers which employ these devices must be greatly expanded to accommodate the large bus sizes of modern processing systems. Due to the great number of chips required in such a configuration, excess power consumption and thermal radiation occur. In addition, problems of signal propagation delay through gates are observed. Further, a large amount of components requires a large amount of physical space.

Therefore, these approaches are impractical when used with new generation of microprocessors, which have increasingly large address and data bus capabilities.

SUMMARY OF THE INVENTION

A software development system has a CPU for controlling the execution of a program. Matcher circuitry is connected to a CPU sample bus for monitoring the sample bus by providing an indication of a match of the value of the bus with predetermined, changeable or programmable digital values.

A storage device is connected to the sample bus and to the processor. The storage device contains the predetermined digital values which the processor has chosen for matching to the values of the sample bus values. The sample bus values are applied as an address to the storage device to obtain one of the predetermined digital values.

A comparator is connected to the processor and to the storage device. The comparator operates in response to the processor and to the one predetermined digital value of the storage device to produce a range match signal indicating the digital value of the sample bus is within a range of the values chosen by the processor.

The comparator may also operate under processor control in response to the one predetermined digital value to produce one or more exact match signals which indicate that the digital value of the sample bus exactly matches a particular digital value chosen by the processor.

DESCRIPTION OF THE PREFERRED EMBODIMENT

Figure 1:
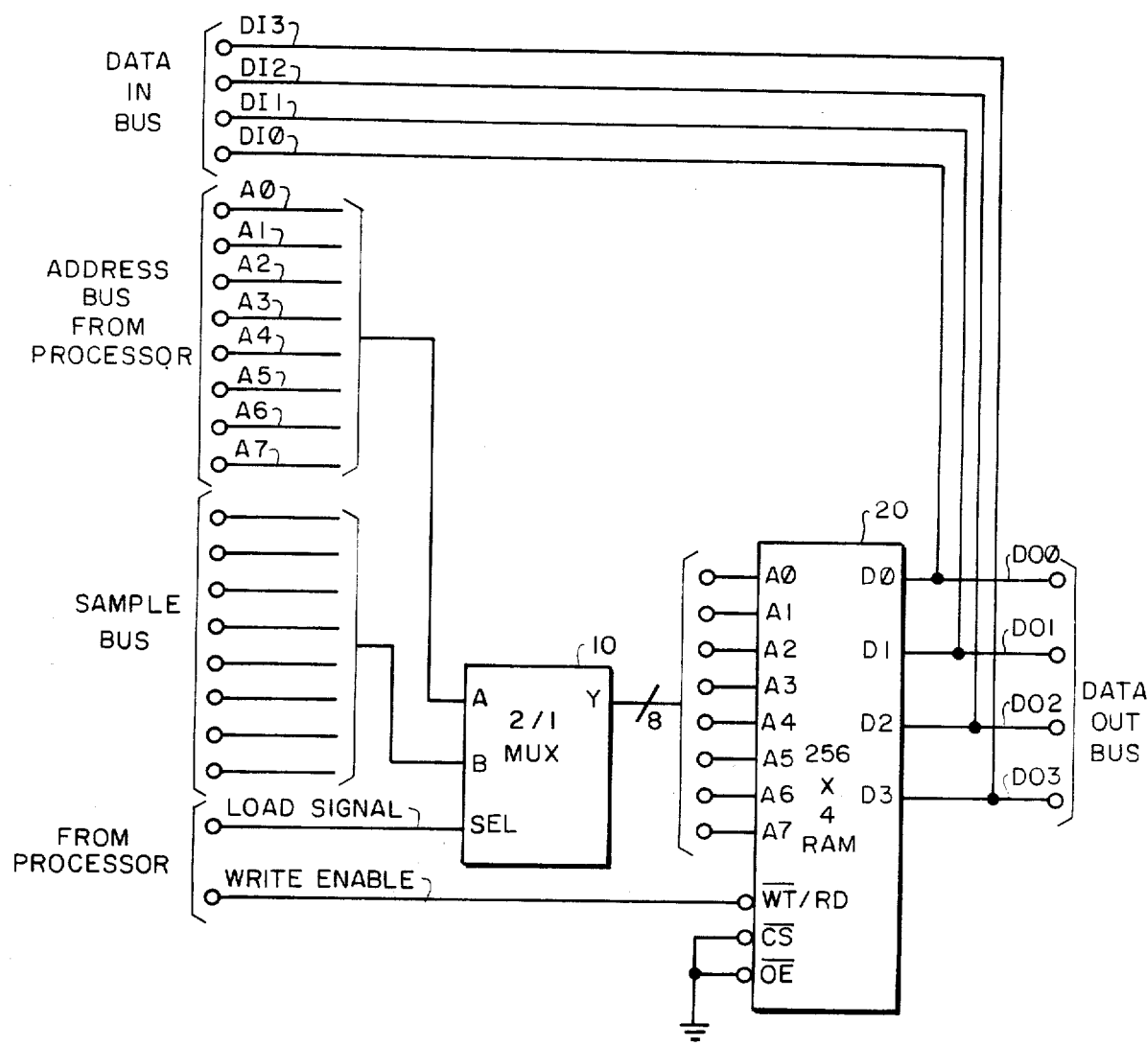
FIG. 1 is a schematic diagram of the detailed connection of a portion of the matcher arrangement of the present invention.

Referring to FIG. 1, the details of the connections between the processor (not shown), which controls the matcher hardware, and the random access memory (RAM) devices is shown. The RAM devices are each 256 by 4-bit static RAM devices, although other size RAMs are also operational. The data in bus DI0-DI3 is connected between the processor and RAM device 20 via the D0-D3 inputs of the RAM device 20. In addition, the data out bus DO0-DO3 is connected to RAM device 20 via the data inputs D0-D3. An eight bit wide address bus of the processor is shown connected to 2-1 multiplexor 10. The eight bit sample bus is also connected to multiplexor 10. This sample bus is the bus which the hardware matcher circuitry is constantly examining for a particular value. A signal from the processor on the load signal lead controls which bus is gated through multiplexor 10 to RAM device 20. Further, a signal on the write enable lead from the processor controls whether RAM device 20 is written to or read from.

The processor may include a central processing unit such as a microprocessor, hard-wired logic or a process controller. When a matching function is required to be performed, the processor will select the addresses to be matched-on and transmit that address via the address bus to RAM device 20. Next, the processor will via the data in bus write logic 1 at the location of the address to be matched on via the right enable lead. The processor may read the contents of this address via the data in bus DI0-DI3 in order to examine the status of a particular location. Multiplexor 10 is connected to RAM device 20 via an 8 byte bus. When the processor is not writing RAM device 20, the load signal lead will be such that the sample bus will be gated through to RAM device for comparing for a match.

Each time the sample bus is gated through multiplexor 10 to RAM device 20, a particular 4 bit data word of the RAM will be accessed. If the contents of this accessed word has been pre-set by the processor with a logic 1, this indicates that a match of that particular address with the sample bus has occurred. The data out bus will contain a 1 on the appropriate data out leads. As a result of this particular address being accessed, a 4 bit data word is read out of memory and transmitted via the DO0-DO3 leads. This indicates that a match has occurred. The contents of each address that has been pre-set with logic 1 will provide an indication of a match on that particular address, when that address is present on the sample bus. Therefore, a number or range of addresses may be matched by writing pre-setting a group of addresses to a logic 1.

In the terminology of matchers, a range is defined of all values between an upper limit and a lower limit. All values between these two limits can be converted into binary RAM addresses. Each of these addresses in the RAM may be programmed with a logic 1 to indicate that this particular address is within the range of the upper and lower limit. As was demonstrated above, a match will occur for any pattern on the sample bus that represents binary value of an address within the selected range.

Circuitry for performing an 8 bit wide match was shown in FIG. 1. Matching circuitry is more complex for values greater than 8 bit.

Figure 2:
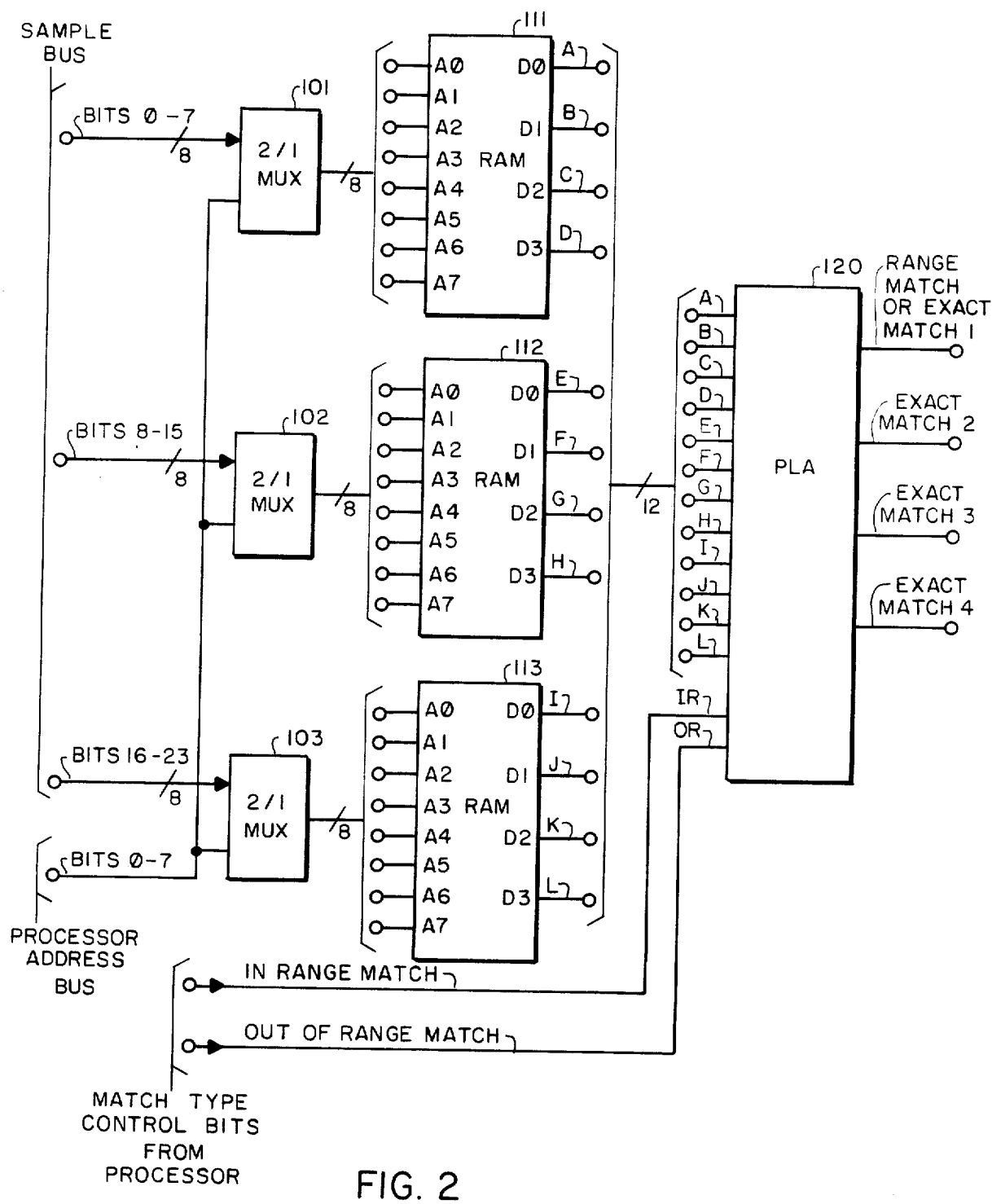
FIG. 2 is a schematic diagram of the principles of operation of the present invention.

FIG. 2 depicts an arrangement for matching upon values which are 24 bits in width. A 24 bit wide sample bus for a processor or other circuitry is broken apart into 3-8 bit quantities. The first 8 bits of the sample bus or bits 0 through 7 are connected to multiplexor 101. The second group of 8 bits 8 through 15 are connected to multiplexor 102 and the third group of 8 bits 16 through 23 are connected to multiplexor 103. Multiplexor 101 is connected via an 8 bit bus to RAM 111; multiplexor 102 is connected via its respective 8 bit bus to RAM 112; and, multiplexor 103 is connected via an 8 bit bus to RAM 113. The 4 data out leads of RAMs 111 through 113 are labeled A through L and are connected to the programmable logic array (PLA) 120. Programmable logic array 120 provides 4 exact match outputs for the 24 bit sample bus. That is, four specific exact values may be compared to the values of the sample bus to determine whether a match exists.

As an alternative to the 4 exact matches, PLA 120 may provide a range match and three exact matches as was indicated above. RAMs 111-113 may be programmed in a fashion similar to that shown by FIG. 1. This programming would indicate the range of addresses to be matched upon by the circuitry. PLA 120 may be implemented with an integrated circuit part no. 82S100 manufactured by Signetics Inc.

Eight bit quantities are called bytes. Matching is accomplished by comparing the most significant digit of the sample value. Several possibilities exist when the most significant digit of the sample value is compared. The first, the most significant digit of the sample value may equal the most significant digit of the lower boundary value. Second, the most significant digit of the sample value may equal the most significant digit of the upper boundary value. Third, the most significant digit of the sample value may equal the most significant digit of both the upper and the lower boundary values. Fourth, the most significant digit of the sample value may be between the most significant digit of the lower boundary and the most significant digit of the upper boundary (i.e. in range). Finally, the most significant digit sample value may be none of the four conditions above and, therefore out of range.

For any particular digit, the sample value must be one of four possible results upon comparison by RAMs 111-113. The RAMs 111-113 must be programmed by the processor for a match on the following conditions. First, sample value equal to the lower bound data bit (D0) of each RAM; second, sample value greater than the lower bound data bit (D1) of each RAM; third, sample value less than the upper bound data bit (D2) of each RAM; and, the sample value equal to the upper bound data bit (D3) of each RAM. Each of these conditions is generated by using one of the data out bits of each RAM. That is, the D0 output of each RAM 111-113 when true indicates the sample value is greater than the lower bound. When data byte 1 is true, that indicates that the sample value is less than the upper bound. When the sample value equals the lower bound D2 of each RAM is true. Lastly when the sample value equals the upper bound the D3 output of each RAM is true.

As shown in FIG. 2, each of the data outputs of the RAMs are labeled A-L consecutively. Therefore, in order to generate a range match all that is required is to combine the outputs of the RAMs A-L in a group of boolean equations that results in the appropriate comparisons. This is accomplished by the programmable logic array 120 which is a collection of AND gates OR gates and inverters. For a range match to be accomplished all that is required is that the particular value satisfy each of the equations given below in Table 1.

TABLE 1

$$\begin{aligned}
\text{IN RANGE} = &\; J \cdot K \\
&+ F \cdot I \cdot \overline{L} \\
&+ A \cdot E \cdot \overline{H} \cdot I \cdot \overline{L} \\
&+ B \cdot E \cdot \overline{H} \cdot I \cdot L \\
&+ G \cdot \overline{I} \cdot L \\
&+ C \cdot \overline{E} \cdot H \cdot \overline{I} \cdot L \\
&+ D \cdot \overline{E} \cdot H \cdot \overline{I} \cdot L \\
&+ F \cdot G \cdot \overline{I} \cdot L \\
&+ A \cdot E \cdot \overline{H} \cdot I \cdot L \\
&+ B \cdot \underline{E} \cdot \overline{H} \cdot I \cdot L \\
&+ C \cdot \overline{E} \cdot H \cdot I \cdot L \\
&+ D \cdot \overline{E} \cdot H \cdot I \cdot L \\
&+ A \cdot E \cdot H \cdot I \cdot L \\
&+ B \cdot C \cdot E \cdot H \cdot I \cdot L \\
&+ D \cdot E \cdot H \cdot I \cdot L
\end{aligned}$$

Any value that satisfies the equation in Table 1 will be within the range specified within the RAMs 111-113.

In order to achieve an arrangement with four exact matchers as was indicated above, the matched RAM control bits (IR and OR) input to PLA 120 are manipulated in appropriate fashion. Next, each one of the outputs of the PLA may provide one exact match, if the equations in Table 2 are satisfied for each exact matcher.

TABLE 2

| |
|---|
| exact match 1 = IR · A · E · I |
| exact match 2 = IR · B · F · J |
| exact match 3 = IR · C · G · K |
| exact match 4 = IR · D · H · L |

It is to be noted that each plus (+) is a logical OR and each period (.) denotes a logical AND with a bar above the symbol being inversion of that signal. By manipulating the IR and OR control bits, PLA 120 may provide an out of range indication instead of an out of range match.

Although the preferred embodiment of the invention has been illustrated, and that form described in detail, it will be readily apparent to those skilled in the art that various modifications may be made therein without departing from the spirit of the invention or from the scope of the appended claim.

What is claimed is:

1. In a software development system having a processor, a matcher arrangement comprising:
   processor bus means for transmitting dynamically changeable predetermined digital values under control of said processor;

sample bus means for transmitting dynamically changeable digital values;

said processor being operated to provide match control signals on corresponding match control leads;

means for storing connected to said sample bus means and to said processor via said processor bus means, said means for storing being operated in response to said digital values of said processor to retain said dynamically changeable pluralities of predetermined digital values;

said means for storing being further operated to produce one plurality of said predetermined digital values of said processor in response to a comparison of said dynamically changeable digital values transmitted on said sample bus means with said digital values stored in said means for storing by said processor;

programmable logic array means connected to said processor via match control lead and to said means for storing, said programmable logic array means being operated in response to first values of said match control signals of said processor and to one plurality of said predetermined digital values to produce a range match signal for said digital value of said sample bus means being within a range of said predetermined digital values, said range match signal being transmitted to said processor; and said programmable logic array means being operated in response to second values of said match control signals of said processor and to said one predetermined digital value to produce at least one of a set of exact match signals for said digital values of said sample bus means being equal to at least one of said stored predetermined digital values, said exact match signals being transmitted to said processor.

2. A matcher arrangement as claimed in claim 1, wherein said means for storing includes multiplexing means connected to said processor and to said sample bus means.

3. A matcher arrangement as claimed in claim 2, wherein said means for storing further includes memory means connected to said processor and to said multiplexing means, said memory means being operated to store said predetermined digital values.

4. A matcher arrangement as claimed in claim 2, wherein said multiplexing means includes a plurality of multiplexer devices, each multiplexer device being connected to a portion of said sample bus means and to said processor.

5. A matcher arrangement as claimed in claim 4, wherein each multiplexer device transmits up to an eight bit value.

6. A matcher arrangement as claimed in claim 3, wherein said memory means includes a plurality of RAM devices, each RAM device being connected to a corresponding multiplexer device and to said processor.

7. A matcher arrangement as claimed in claim 7, wherein each RAM device includes eight bits of address input.

8. A matcher arrangement as claimed in claim 6, wherein each RAM device includes a 256×4-bit word RAM memory.

9. A matcher arrangement as claimed in claim 3, wherein said program logic array means includes a PLA device having at least fourteen inputs and four outputs.

* * * * *